United States Patent
Fouchard

(10) Patent No.: US 11,924,647 B2
(45) Date of Patent: Mar. 5, 2024

(54) METHOD FOR SECURE CONNECTION TO AN EMBEDDED WEB SERVICE AND CORRESPONDING DEVICE

(71) Applicant: Eric Fouchard, Bruz (FR)

(72) Inventor: Eric Fouchard, Bruz (FR)

(*) Notice: Subject to any disclaimer, the term of this patent is extended or adjusted under 35 U.S.C. 154(b) by 302 days.

(21) Appl. No.: 17/607,679

(22) PCT Filed: May 4, 2020

(86) PCT No.: PCT/EP2020/062345
§ 371 (c)(1),
(2) Date: Oct. 29, 2021

(87) PCT Pub. No.: WO2020/221938
PCT Pub. Date: Nov. 5, 2020

(65) Prior Publication Data
US 2022/0232390 A1    Jul. 21, 2022

(30) Foreign Application Priority Data

May 1, 2019   (FR) ...................................... 1904600

(51) Int. Cl.
*H04W 12/77* (2021.01)
*H04L 9/40* (2022.01)
*H04W 12/06* (2021.01)

(52) U.S. Cl.
CPC ......... *H04W 12/77* (2021.01); *H04L 63/0861* (2013.01); *H04W 12/06* (2013.01)

(58) Field of Classification Search
None
See application file for complete search history.

(56) References Cited

U.S. PATENT DOCUMENTS 9,497,293 B2 * 11/2016 Somadder ............. H04W 12/50
10,885,507 B1 * 1/2021 Phillips ............... G06F 11/0793
(Continued)

FOREIGN PATENT DOCUMENTS

WO    2017209363 A2    12/2017

OTHER PUBLICATIONS

McCune, "Seeing-Is-Believing: Using Camera Phones for Human-Verifiable Authentication", published 2005, pp. 1-14. (Year: 2005).*
(Continued)

*Primary Examiner* — Benjamin E Lanier
(74) *Attorney, Agent, or Firm* — David D. Brush; Westman, Champlin & Koehler, P.A.

(57) ABSTRACT

A method for securely connecting and providing access to an onboard web service, between an item of client equipment, including a screen, and a mobile device, equipped with a camera. The method, is implemented by the mobile device and includes: establishing a wireless connection with the item of client equipment; transmitting a unique pictogram onto the screen of the item of client equipment; reading the pictogram, displayed on the screen of the item of client equipment, using the camera of the mobile device; authenticating the item of client equipment, by comparing data from the transmitted pictogram with the data from the pictogram that was read by the camera; and opening a secure connection and access to an onboard web service on the mobile device, for the item of client equipment.

10 Claims, 5 Drawing Sheets

(56) References Cited

U.S. PATENT DOCUMENTS

Figure 2A:
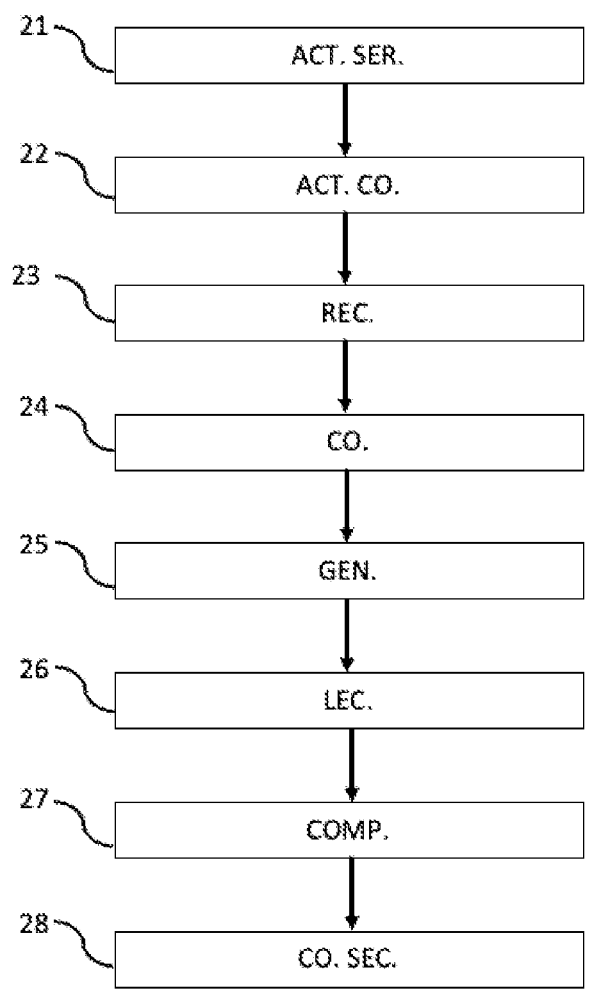

| 2014/0282923 | A1* | 9/2014 | Narayan | H04W 12/50 |
| | | | | 726/5 |
| 2015/0215770 | A1* | 7/2015 | Chan | H04W 8/14 |
| | | | | 455/456.1 |
| 2016/0180100 | A1* | 6/2016 | Britt | G06F 21/36 |
| | | | | 726/27 |
| 2018/0091304 | A1* | 3/2018 | Brook | H04L 9/3066 |
| 2018/0336332 | A1 | 11/2018 | Singh et al. | |

OTHER PUBLICATIONS

International Search Report dated Jun. 4, 2020 for corresponding International Application No. PCT/EP2020/062345, dated May 4, 2020.

Written Opinion of the International Searching Authority dated Jun. 4, 2020 for corresponding International Application No. PCT/EP2020/062345, filed May 4, 2020.

Anonymous, "Secure Socket Tunneling Protocol—Wikipedia", Apr. 11, 2019 (Apr. 11, 2019), Retrieved from the Internet: URL:https://en.wikipedia.org/w/index.php title=Secure_Socket_Tunneling_Protocol&oldid=892030090, XP055701038.

English translation of the Written Opinion of the International Searching Authority dated Jun. 19, 2020 for corresponding International Application No. PCT/EP2020/062345, filed May 4, 2020.

Search Report and English translation of Written Opinion of the French Searching Authority dated Feb. 20, 2020 for corresponding French Application No. 1904600, filed May 1, 2019.

\* cited by examiner

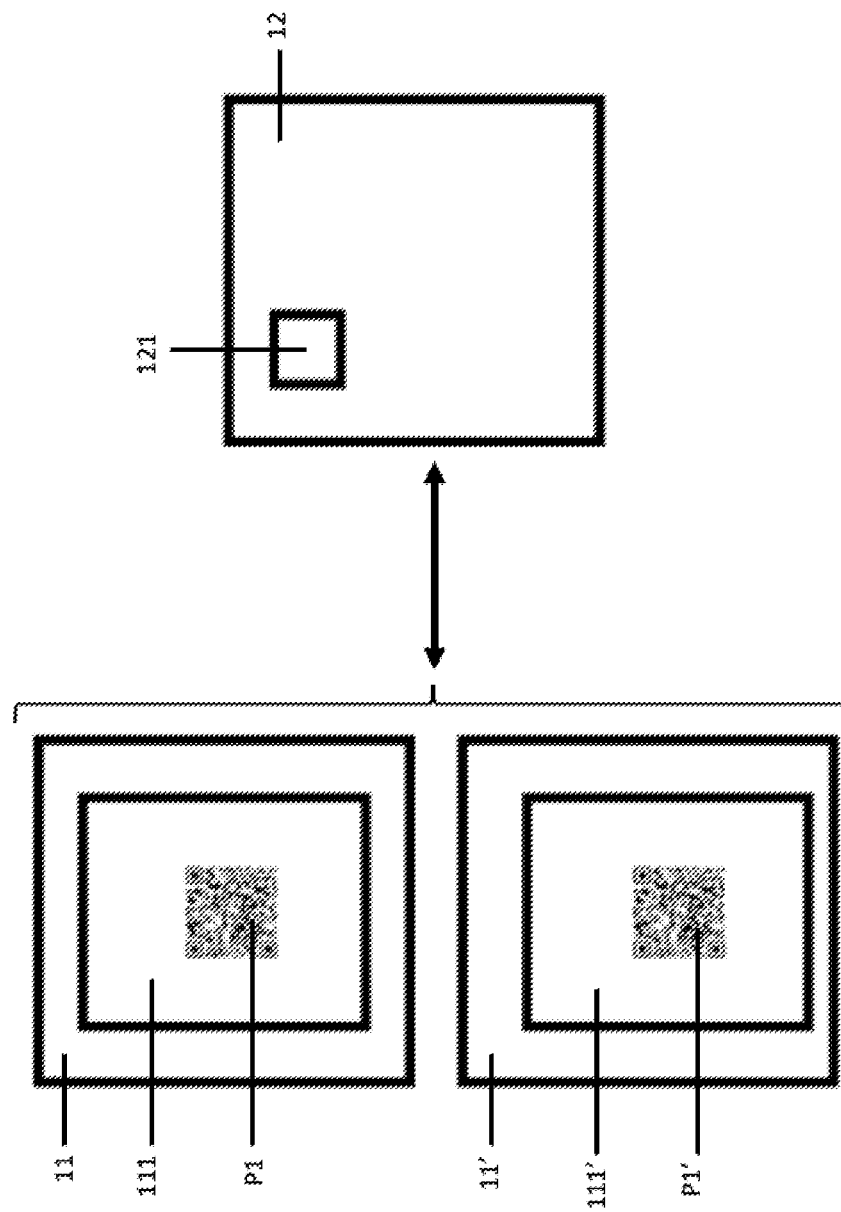

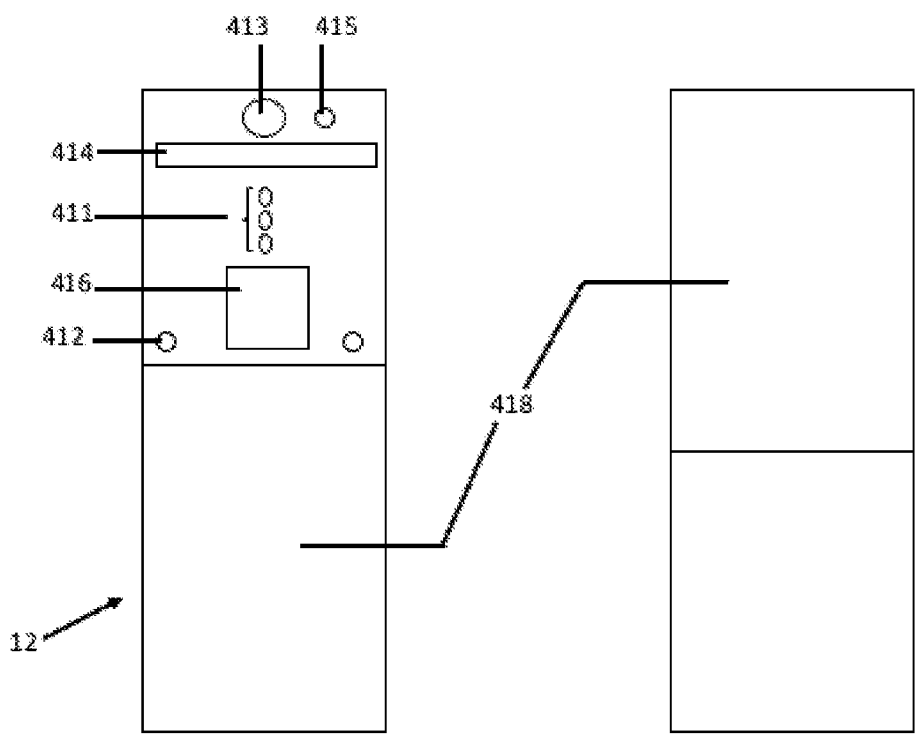
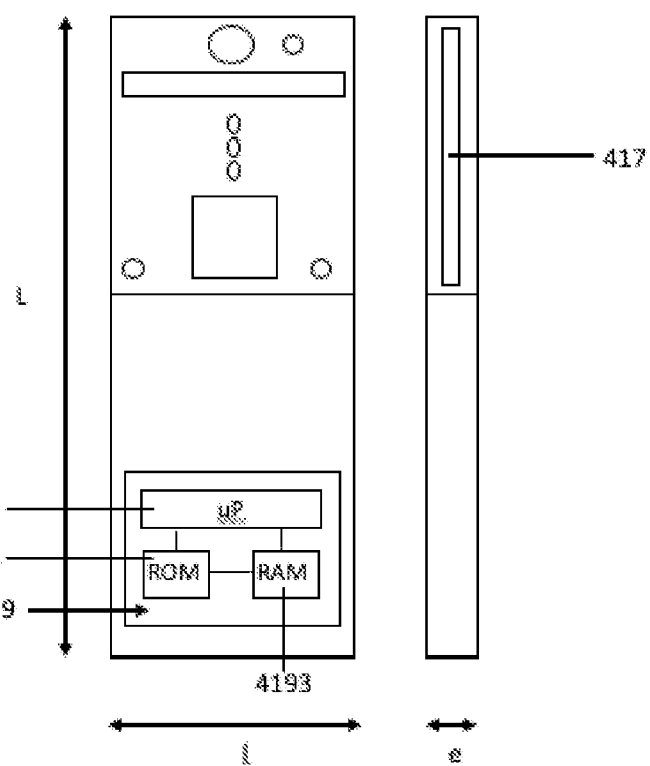
Fig. 4

METHOD FOR SECURE CONNECTION TO AN EMBEDDED WEB SERVICE AND CORRESPONDING DEVICE

CROSS-REFERENCE TO RELATED APPLICATIONS

This Application is a Section 371 National Stage Application of International Application No. PCT/EP2020/062345, filed May 4, 2020, the content of which is incorporated herein by reference in its entirety, and published as WO 2020/221938 on Nov. 5, 2020, not in English.

1. FIELD OF THE INVENTION

The field of the invention relates to the simplification and securing of connection and data transfer between electronic equipment (server and client), regardless of their operating system (Windows/Apple/Linux/Android (registered trademark)), and in particular to the establishment of wireless (wifi, Bluetooth (registered trademark), etc.) secure connections with strong authentication.

In particular, the invention applies to the secure connection of a client equipment to a web service embedded in a mobile device, in particular for person identification or authentication web services.

2. PRIOR ART

Securing the connections between two pieces of equipment, called later on "server" and "client" is a major concern, and many solutions have been proposed. This is the case in particular when the server should provide check and authentication services, and for example services of recognition and/or identification, in particular for security controls (police forces for example), of access to restricted areas, products or data, for identifications (access to a vote for example).

According to a particular approach, 2D barcodes are used, for example, to confirm the identity of a user when he/she tries to connect to a web service. In this use case, the user will use the camera of his/her telephone to read a barcode provided by the server and restitute it on the screen of a client computer, and transmit, via a wireless connection, a return to the server confirming the identity of the user. The server then serves the client. But this is done in the context of pre-established network connections. The fact that these connections are pre-established introduces a major flaw in terms of security.

Moreover, to establish a wireless connection, an encryption key, often long and difficult to retain, has to be entered.

When it is desired to share files in multiplatform mode, a software specific to the client or to the server (to each system software) has to be installed. Besides the difficulty to find this suitable software, this introduces a high risk on the security and integrity of the apparatuses, since broad rights have to be granted to enable data exchange.

3. PRESENTATION OF THE INVENTION

Hence, there is a need for solutions that are more secure and also simpler to implement. For this purpose, the invention proposes a method for connection between a client equipment, comprising a screen, and a server equipment. According to the invention, said server equipment is a mobile device equipped with a camera, and the method, implemented by said mobile device, comprises:

a step of transmitting a unique pictogram on the screen of the client equipment;

a step of reading said pictogram, displayed on the screen of the client equipment, using the camera of the mobile device;

a step of establishing a secure wireless connection with the client equipment; and a step of providing access to a web service embedded on the mobile device, via the secure wireless connection, for the client equipment.

The invention proposes a quite novel and inventive approach to connect a client equipment to a web service in a secure and simplified manner. For this purpose, it is based on the use of a unique mobile equipment, which fills at the same time the functions of authentication of the client equipment, of routing the wireless connection of said client equipment and of a server providing the web service requested by the client equipment. As regards authentication, the mobile device sends a pictogram to a client equipment only when the latter requests connection to said device. However, the mobile device each time generates a unique pictogram, for example using a pseudo-random generator. Advantageously, it continuously generates unique pictograms, for example every millisecond, when it is turned on.

In this manner, in the case where several potential client equipments would request connection at the same time, each would obtain a different pictogram.

On the one hand, the mobile device sends a different pictogram at each request for connection and, on the other hand, it is upon it to select the client equipment located nearby, on the screen of which it will capture the sent and displayed pictogram. This guarantees the impossibility for a hacker to replicate a connection or to try to recover the pictogram intended for another client equipment. Indeed, if a hacker equipment, located at a distance from the mobile device, intercepts the pictogram intended for the client equipment that has requested connection to said device, it cannot, in any manner whatsoever, substitute for the requester client equipment, since it cannot physically present its screen to the mobile device instead of that of the requester client equipment actually proximate to said device. In addition, the pictograms generated randomly by said device are different from each other. Notably, it is impossible to deduce a pictogram based on the pictograms generated before. Hence, the authentication proposed by the invention is strong.

Once the client equipment is authenticated, the establishment of the secure wireless connection between the client equipment and the mobile device is done by the latter. This is very different from the conventional approach, according to which the establishment of the connections is ensured by a router, for example a wifi router, which cannot be displaced at the client equipment. Based on the strong authentication, the connection is established according to the invention simply and effectively, without having to enter any "login"/password. Through the established connection, the exchanged data could then be encrypted for more security.

Finally, the mobile device implements the web service requested by the client equipment. Hence, it also serves as a server, for the web service(s) embedded therein. By web service, it should be understood a software or middleware with a computer interface which enables data exchange between heterogeneous systems, without the need for installing suitable software or applications in the server or in the client. In this instance, this service could be performed locally, or, alternatively, using remote data accessible through the secure connection, when the client equipment is connected to the Internet.

Thus, in contrast with the prior art, which resorts to an intermediate element to film, for example with a mobile phone, a barcode, and transmit it to a server (often to confirm an authentication on a computer), the solution proposed by the invention is integrated into one single mobile device, allowing reducing the complexity of the operations and of the exchanges to be done to provide access to the service requested by the client equipment, and at the same time limiting the risks related to security, while avoiding resorting to specific software applications on the client equipment.

Finally, it should be noted that the connection to the web service established according to the invention is unique and temporary, since at each new activation of the web service, the process is reiterated in its entirety.

According to a particular implementation, the method of the invention comprises an initial step of authentication of the user of the mobile device using biometric device of said user, such as fingerprints, face, voice or iris data.

This biometric authentication of the user of the mobile device, prior to every connection with the client equipment of said user, reinforces the security of the method for providing access to a web service. Indeed, it allows ensuring that the user of the mobile device is actually authorised to access said web service, and therefore prevents an impostor from fraudulently using the mobile device.

According to an aspect of the invention, the step of wireless connection between the mobile device and a client equipment is set in place following the activation of a web service embedded in said mobile device by a user, on said mobile device.

For example, the user just turns on the mobile device, which triggers the activation of the web service, or, he/she presses on a physical button of the mobile device to select the service to be activated. An advantage of such a physical activation is that it does not require the implementation of telecommunication means. It confers an additional safety, since only one user having the mobile device within reach could activate a web service. According to another aspect of the invention, the establishment of the secure wireless connection between the mobile device and a client equipment comprises opening of an SSL tunnel type secure channel between said client and said mobile device.

For example, the secure channel is an SSL (standing for "secure Sockets Layer") tunnel. An advantage of opening such a channel is that it allows exchanging data and sharing files in a secure manner, between the client equipment and the mobile device, the data transmitted through the secure channel being encrypted.

According to still another aspect of the invention, the or one of said web services embedded in the mobile device is a service of identity check and/or authentication of an individual, and comprises the following steps:
  gathering of biometric data of the individual, using the mobile device;
  obtainment of reference data of said individual, using the mobile device;
  comparison of said gathered biometric data with said reference data of said individual, by the mobile device;
  transmission of a message to said client equipment via the secure wireless connection, said message comprising a confirmation of the identity of said individual, if a correspondence has been found between said gathered biometric data and said reference data, or a disconfirmation of the identity of said individual, otherwise.

Obtaining the biometric data of a controlled individual, through the identity check embedded web service of the mobile device, is achieved using biometric means located on said device. These biometric means correspond to sensors, configured to gather biometric data representative of this individual, such as his/her fingerprints, his/her face, his/her iris, etc. These biometric means may comprise a data card reader, configured to read biometric data recorded in an identification data card of the individual, such as his/her driving license, his/her national identity card or his/her passport. These read biometric data form reference biometric data for identity check.

Such a method has the advantage of monitoring the identity of an individual in a simplified manner, since the obtainment of the biometric data of the controlled individual is performed only with the mobile device, using its own physical interfaces, comprising said biometric means. According to the invention, it is also the mobile device that performs the comparison of the biometric data gathered with the reference biometric data and checks up their correspondence. In this manner, all check operations are carried out by the mobile device and only the result of this identity check is sent to the client equipment of the user. Hence, an advantage of the method of the invention is to make the identity check service accessible to every user of a terminal equipment, regardless of the hardware and software configuration of this equipment. It should be noted that such a hardware and software compatibility problem is particularly important in the biometric data processing field, because the SDKs (standing for "Software Development Kit") made available to the developers are not compatible with all Oss (standing for "Operating System") installed on the mobile phones available on the market. In this context, the solution of the invention, based on a web service embedded in a mobile device, therefore finds a particularly relevant and useful application.

According to another aspect of the invention, first reference data of the controlled individual are obtained by reading a data card, using the mobile device, said data card comprising said first reference data.

For example, the reader is a contactless data reader, based on an NFC-type (standing for "Near-Field Communication") technology. Alternatively, the reader is a smart card reader and comprises a slot into which the card is inserted. An advantage of this embodiment is that the mobile device allows, alone, obtaining all biometric data of the individual, without the need for means for connection to a communication network. Thus, the identity of the individual could be checked locally, by one single mobile device. Such independence with regards to the quality of the coverage of the mobile network guarantees a preserved quality of the identity check service in a white area or featuring a degraded quality of access to the mobile network.

According to still another aspect of the invention, second reference data of the controlled individual are obtained by interrogation of a remote database via the secure connection established with the client equipment, said reference data are compared with the obtained biometric data and a message confirming the identity of said individual is transmitted only if a correspondence between said obtained biometric data and said second reference data has been found.

For example, non-biometric identification data, such as the name and the first name of the individual, are read on the identification data card of the individual and transmitted to the remote database in an interrogation query, which replies by sending the second reference biometric data stored in association with these non-biometric identification data.

Such a method has the advantage of reinforcing the control of the identity of the individual, by taking advantage of the established secure connection and of an access to a remote communication network, for example the Internet, through a connection to the mobile network, available at the client equipment. Indeed, being able to access remote databases in a secure manner using the client equipment connected to the mobile device allows, for example, detecting a falsification of the presented official identity document, or obtaining additional information on the controlled individual, for example recorded in his/her criminal record. In this manner, the proposed service is performed with an increased security level, without the need for an additional physical interface at the mobile device, which remains simple and inexpensive.

Correlatively, the invention also relates to a mobile device, comprising a camera, a processor and at least one memory, this memory comprising a computer program product adapted to ensure, when it is executed by said processor, a function of securing a wireless connection with a client equipment and a function of providing access to a web service embedded in the mobile device to said client equipment, its processor being configured to:
- activate a wireless connection with the client equipment;
- transmit a unique pictogram to said client equipment;
- read the pictogram displayed on the screen of the client equipment, using the camera of the mobile device;
- authenticate the client equipment, by comparison of the data of the pictogram transmitted with the data of the pictogram read by said camera;
- establish the secure wireless connection with the client equipment; and
- provide to said client equipment an access to a web service embedded on the mobile device, via the secure connection.

More generally, such a movable device is adapted to implement a method for secure connection and for providing access to an embedded web service, as described before, according to its different embodiments.

According to the invention, the mobile device fills, alone, at the same time the functions of authentication of the client equipment, of routing the wireless connection of said client equipment and of a server providing the web service requested by the client equipment. According to an aspect of the invention, the mobile device comprises:
- at least one biometric data sensor, configured to gather biometric data of an individual;
- a data medium reader, configured to read reference data stored in an identification data medium of said individual;

and said processor is further configured to:
- gather biometric data of an individual, using said biometric data sensor;
- obtain reference data of said individual by reading said identification data medium of said individual, using said reader;
- compare said gathered biometric data with said reference data of said individual;
- transmit a message to said client equipment via the secure wireless connection, said message comprising a confirmation of the identity of said individual, if a correspondence has been found between said gathered biometric data and said reference data; or a disconfirmation of the identity of said individual, otherwise.

In this manner, the mobile device integrates both the physical interfaces necessary to obtain biometric data and corresponding reference data of the controlled individual, and the software and hardware computer means to perform the operations of checking the obtained biometric data. The web service embedded in the mobile device natively enabling the data exchange between such heterogeneous means, only the result of the identity check is transmitted to the client equipment. Thus, the fact that the means implemented to perform the identity check service are entirely located on the mobile device completely relieves the user of the client equipment from the software and hardware compatibility problems of the prior art. Indeed, all it needs to enable the completion of the service is to provide the client equipment with a screen and with a wireless connection means to connect with the mobile device.

According to another aspect of the invention, the processor is configured to obtain second reference biometric data of said individual, by interrogation of a remote database via the secure connection with the client equipment, and to compare the obtained biometric data with said second reference biometric data, the message confirming the identity of said individual being transmitted to said client equipment only if a correspondence has been found between said gathered biometric data and said second reference biometric data.

Advantageously, the use of second reference biometric data allows for a reinforcement and reliability of the identity check of the individual, through the established secure connection.

The aforementioned mobile device has at least the same advantages as those conferred by the connection method according to the present invention.

4. DISCLOSURE OF THE FIGURES

Figure 2B:
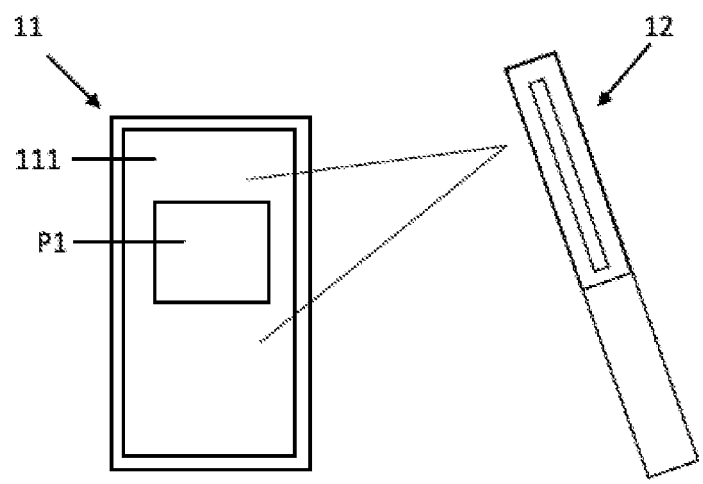
Figure 3A:
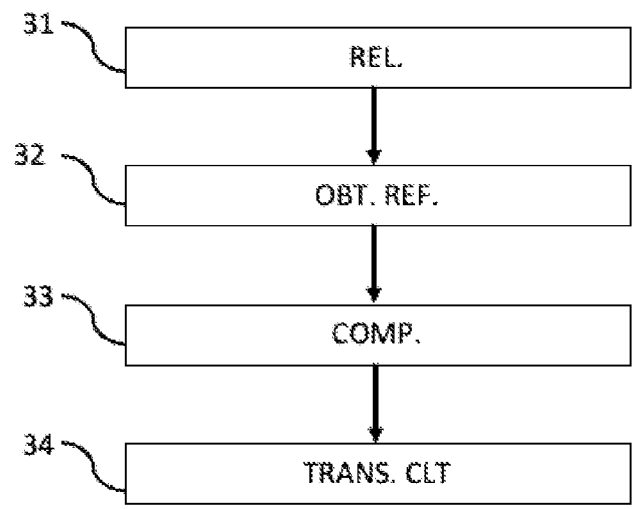
Figure 3B:
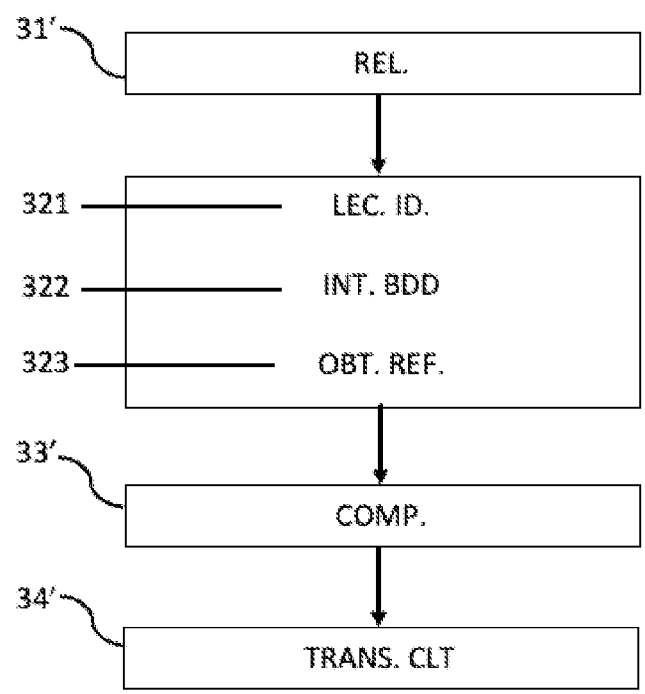
Figure 3C:
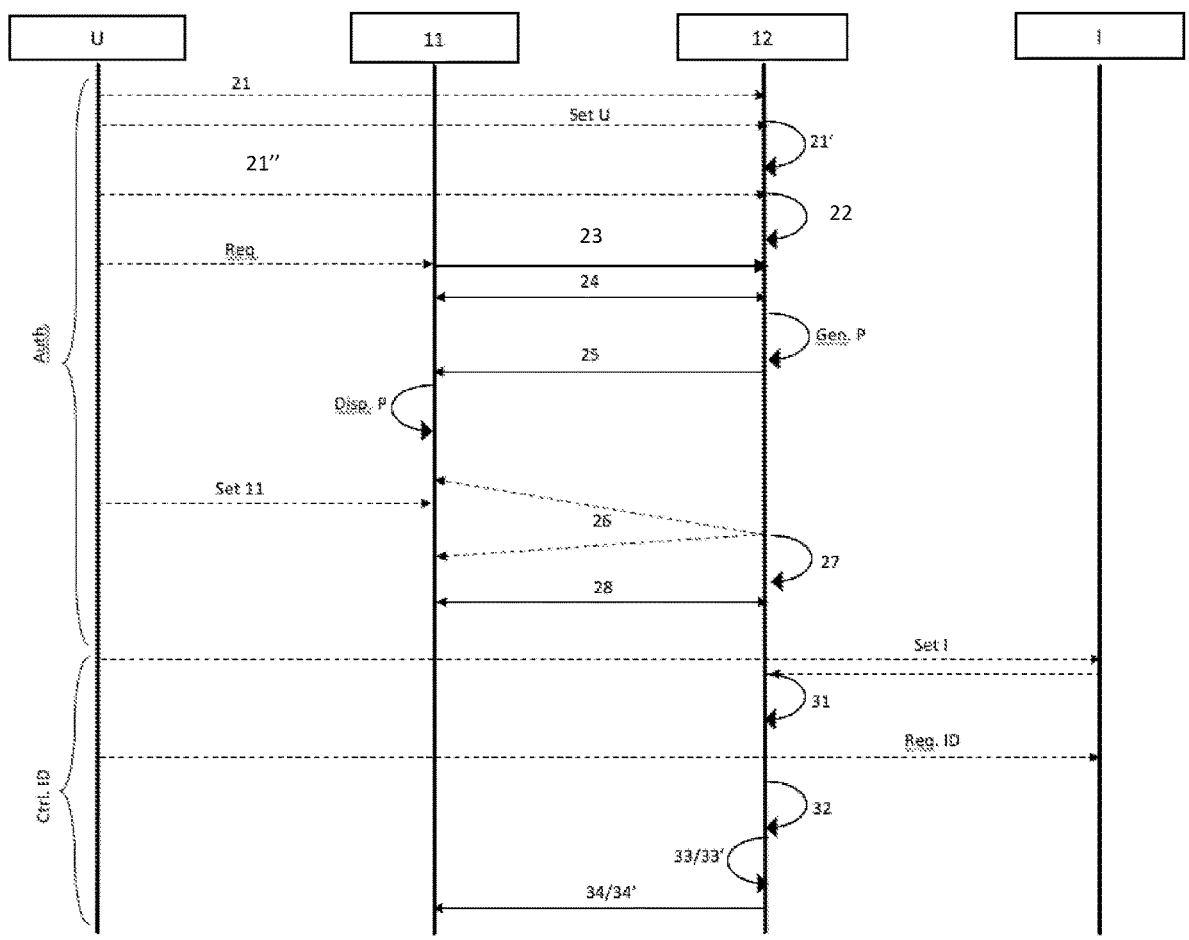

Other objectives and advantages of the invention will appear upon reading the following description, of an embodiment of the invention, provided just as an illustrative and non-limiting example, and from the appended drawings, wherein:

FIG. 1: schematically illustrates the principle of secure connection of one or several client equipment to a mobile device according to the invention;

FIG. 2A: illustrates an embodiment of the method of the invention;

FIG. 2B: schematically illustrates the authentication of the client equipment by the mobile device;

FIG. 3A: illustrates an embodiment of the method of the invention, when the embedded web service carries out an identity check of an individual;

FIG. 3B: schematically illustrates another embodiment of the method of the invention, when the embedded web service carries an identity check of an individual;

FIG. 3C: schematically illustrates the interactions between the mobile device, the user, the client equipment of the user and the individual to be controlled, when the embedded web service carries out such an identity check; and FIG. 4: schematically illustrates an example of a hardware structure of a mobile device implementing the method of the invention.

5. DESCRIPTION OF A PARTICULAR EMBODIMENT

A principle of the invention consists in providing a user of a client equipment with a secure access to one or several web service(s) embedded on a mobile device located nearby. For the record, a web service is a standardised medium, in the form of a software module, adapted to perform particular tasks. A server, embedding the web service, may be interrogated by a client, by means of queries. The server returns back the requested data. The data are exchanged according to the XML standard.

In this instance, these web services may in particular consist of:
- services related to recognition and authentication, for piloting for example means for reading documents, in particular secure documents, like an identity card, a driving license, an electoral card, an access authorisation, etc., for example in the form of a camera and/or a card reader, with or without contact;
- services related to the recognition/identification of a person, in particular to pilot means for reading biometric data (fingerprint recognition, face recognition, voice recognition, iris recognition, etc.).

According to the invention, these different services are implemented in a mobile device, preferably equipped with the sensors necessary to the implementation of these services. This mobile device initiates beforehand a secure connection with a client equipment, for example a mobile phone or a tablet, which ensures in particular a terminal role, in particular via its screen.

Thus, the client equipment has secure access to the web services provided for the mobile device, without the need for having any dedicated application or particular setting beforehand. Any conventional terminal, provided with a screen and adapted to exploit web services, could be paired to the mobile device, which ensures the entirety of the process of securing the connection and afterwards the implementation of the web services.

Referring to FIG. 1, a user of a client equipment 11 who wishes to establish a secure connection to access a particular web service, from his/her client equipment 11, for example a computer a tablet or a mobile telephone, provided with a screen 111, is considered. For this purpose, he/she uses a dedicated mobile device 12, equipped in particular with a camera 121. As example, he/she could be a member of law-enforcement forces who wishes to perform identity checks, using his/her telephone or his/her tablet (which does not need to be provided with any particular application, and could therefore be of any type and of any standard, as long as it is adapted to communicate via the Internet) and the mobile device of the invention.

Referring to FIG. 2A, the steps of a method according to the invention, implemented by the mobile device 12, according to an embodiment of the invention, are now described. Said method comprises the following steps:
- step 21: the user turns on, or activates, the mobile device 12, which triggers the activation of the web service, if only one is available on said device 12, or he/she selects, for example by pressing on a physical button of this mobile device 12, the web service to be activated amongst the different proposed services;
- step 22: in both cases disclosed at step 21, the activation of the web service triggers the start-up of a wireless connection service, for example of the Wifi type. In other words, the mobile device 12 activates an embedded Wifi router. Of course, the exchanges could be implemented with other data exchange protocols, for example Bluetooth® or Zigbee®;
- step 23: the client equipment 11, located proximate to the mobile device 12, requests establishing a connection with the Wifi router of the mobile device 12, for example by selecting said wireless connection service, visible on its screen 111. In some situations, several distinct client equipment could request the connection with said device 12 (client equipment 11 and 11'), for example in the case of law-enforcement sharing the same mobile device, each being provided with his/her own client equipment, for example his/her telephone. The mobile device 12 receives the connection request of the client equipment 11 (or each request, which will then be processed independently);
- step 24: an IP connection is established between the mobile device 12 and the client equipment 11;
- step 25: the mobile device 12 replies to the client equipment 11 by transmitting thereto a unique pictogram P1, that has been generated thereby pseudo-randomly. If several clients (11, 11') request connection with said device 12, said device sends a different pictogram (P1, P1') to each of the clients (cf. FIG. 1);
- step 26: the camera 121 of the mobile device 12 reads the pictogram displayed on the screen 111 of the client equipment 11. This step 26 is illustrated more accurately in FIG. 2B, where it is visible that the device 12 captures an image of the pictogram P1 displayed on the screen 111 of the client 11, using its camera 121;
- step 27: the mobile device 12 then internally compares the data of the pictogram P1 gathered by its camera 121 on the screen 111 of the client 11 with the data of the pictogram that it has sent itself, to confirm the source;
- step 28: if there is a correspondence, the mobile device 12 authenticates the client equipment 11 and authorises the router to establish a secure connection with the authenticated client equipment 11. Otherwise, it rejects the connection request. Thus, the mobile device 12 itself ensures the establishment of a secure, unique and distinct connection, with the client equipment 11.

The secure connection implements a data encryption, for example according to a public key/private key mechanism, the public key having been transmitted in or at the same time as the pictogram. Through this secure connection, the mobile device 12 provides the client equipment 11 with access to the web service requested thereby.

Similarly, the mobile device 12 authenticates the client equipment 11'.

It should be noted that, rather than requesting connection to the Wifi router of the mobile device 12 in the same manner as the client 11, the client equipment 11' could also be a hacker equipment that would have intercepted the message comprising the pictogram P1 intended for the client equipment 11. Nonetheless, according to the invention, it cannot authenticate before the mobile device 12, unless it could access it physically, to use it and get the image of the pictogram displayed on its screen. But even in this case, the mobile device 12 would identify a problem and would set itself in a security mode, since a first connection would have been performed with the same connection.

Thus, the established connection is secured by the fact that the authentication (initiation, with the generation of the pictogram and reading of the latter on the screen) and the establishment of the connection are performed by the same device, which also ensures the provision of the embedded web service requested by the client equipment.

The connection is intended for one single use and the client is locally identified, by reading the pictogram displayed on its screen using the camera of the mobile device. This allows effectively reducing the risks of hacking during the establishment of the wireless communication. Indeed, a hacker client who intercepts a pictogram transmitted by the mobile device, to a real client, can never be authenticated before said device, since the local step of reading said pictogram on the screen of the client equipment is necessary for the completion of this authentication. The fact of obtaining information by the camera of the mobile device prevents any "man in the middle" type attack.

The wireless connection process is simplified to the extreme, since there is no password tedious to enter, neither on the client equipment nor on the mobile device, and no software application to be installed on either one of these devices. This avoids the risk of error on the password, of loss of the latter, or of inscription of the latter for reminder. Thus, the invention allows offering a connection associated to an embedded web service, and therefore proposing a service, for example, of cross-platform (iOS (registered trademark), Android (registered trademark), Windows (registered trademark), Linux (registered trademark), etc.) file sharing, without any effort and without any third-party software to be installed on the client equipment.

Henceforth, referring to FIGS. 3A to 3C, an embodiment of the invention, according to which the web service embedded by the mobile device 12 is a service for checking the identity of an individual, is described. For example, the user of the client equipment 11 and of the mobile device 12 is an officer of low-enforcement forces and he/she wishes to check the identity of an individual that he/she has just stopped.

It should be recalled that access to this web service is authorised and effective only once steps 21-28 have been successfully executed.

In this embodiment of the invention, the mobile device 12 is equipped with one or several specific physical interface(s), adapted for gathering biometric data of an individual and/or upon reading information recorded on a removable data card or a dedicated data medium. For example, it consists of a fingerprint sensor/reader, a camera or a smart card or contactless data reader. Such a mobile device 12 is described in more detail hereinafter, with reference to FIG. 4.

According to the embodiment of FIG. 3A, the identity check method of the invention comprises the following steps:
- step 31: gathering the biometric data of the individual using a suitable physical interface, integrated to the mobile device 12, for example taking his/her fingerprints using a fingerprint reader, or capture of his/her face and/or of the iris using a camera, for example a standard and/or infrared camera;
- step 32: reading by a dedicated reader of a data card presented by said individual and intended to identify him/her officially, such as his/her driving license or his/her identity card; for example it consists of a smart card that is inserted into a smart card reader integrated to the mobile device 12, or a data card that is approached to a contactless data card reader (NFC for example), and obtainment of the reference biometric data of the individual, stored in said card, represented for example by one of his/her fingerprints or of one of his/her irises;
- step 33: comparison of the biometric data of the individual, gathered using the physical interfaces (sensors/readers) of the mobile device 12, with the reference biometric data of said individual, obtained by reading of the data card of the individual;
- step 34: transmission to the client equipment 11 of a message confirming or disconfirming the identity of the controlled individual, according to the results of the comparison of step 33.

FIG. 3B illustrates a variant of the embodiment of the identity check web service according to the invention. The first step 31' is equivalent to step 31 of the method of FIG. 3A and is not described further more. The client equipment 11 is deemed to be provided with a connection to an Internet or Intranet type wide-area communication network, for example through a mobile radio access network.

According to this variant, step 32 of obtaining reference data of the method further comprises:
- step 321: reading of non-biometric identification data, for example the name and the first name of the individual, on the data card of the individual;
- step 322: transmission of a query for interrogating a remote database, via the secure connection with the client equipment 11 and an access to the wide-area communication network the client equipment is provided with. This query comprises the non-biometric identification data read at step 321, and a request for obtaining second reference biometric data of the individual, stored in the remote database in association with the non-biometric identification data of this individual;
- step 323: reception of a reply to said query:

In 33', the mobile device 12 proceeds with an additional comparison, that of the gathered biometric data with the second reference biometric data and confirms the identity of the individual only in case of double correspondence.

Step 34' is unchanged in comparison with step 34 of the method of FIG. 3A.

According to this variant of the method for identifying an individual, the second reference biometric data of the controlled individual are obtained remotely, through the secure connection. It should be understood that this identity check offers a reinforced security level, since it allows detecting whether the individual has a falsified identity document.

FIG. 3C illustrates the interactions between the mobile device 12, the client equipment 11, the user of this equipment, for example a control officer U and the individual. To better distinguish them, the physical/direct interactions have been represented by dotted lines and the data exchanges through a communication channel have been represented by solid lines.

At 21, the control officer U activates/turns on the mobile device 12 according to the invention. Optionally, at 21', he/she authenticates before the mobile device, which gathers his/her biometric data (fingerprints, face, iris, voice, etc.) and compares them with reference data. For this purpose, the officer U physically interacts with the mobile device 12 (bearing the reference Set U in FIG. 3C), for example by placing his/her finger on the fingerprint sensor of said device. Once authenticated, the control officer activates, at 21", the identity check web service embedded on the mobile device 12, for example by pressing a button of a human/machine interface of the mobile device 12. In 22, the mobile device 12 opens a Wifi connection. For example, the control officer selects the wireless connection service of the mobile device, visible in the screen of his/her client equipment 11 and, at 23, sends a request Req for connection to the mobile device 12. The mobile device 12 receives this connection request and, at 24, establishes a wireless connection with the client equipment 11.

The mobile device 12 generates a unique and non-sequential pictogram P, for example pseudo-randomly, and, at 25, sends it to the client equipment via the wireless connection. The client equipment 11 displays it on its screen. The control officer U then places the screen of his/her client equipment 11 in the field of the camera of the mobile device 12 (bearing the reference Set 11), so that the mobile deice could read the pictogram displayed at 26. At 27, the mobile device 12 compares the data of the pictogram that it has sent with the data of the pictogram read by its camera on the client equipment screen 11. If there is a correspondence, the mobile device authenticates, at 28, the client equipment 11, establishes a secure connection with said equipment, for example through an SSL tunnel, and provides the client equipment 11 with access to the identity check service requested by the officer U.

Henceforth, the mobile device 12 is ready to perform the identity check service. When stopping an individual I, the control officer U asks him/her to present an identity document, for example his/her national identity card, his/her passport or his/her driving license. At 31, the control officer gathers biometric data of the individual, such as his/her fingerprints, his/her face, his/her iris, his/her voice, etc., using a biometric data sensor located on the mobile device 12. For this purpose, for example, the officer U positions the finger of the individual on the fingerprint sensor of said device (bearing the reference Set I). Afterwards, the officer inserts such a data card into the data card reader of the mobile device 12 (bearing the reference Req. Id), which reads, at 32, the identification data contained therein. He/she could also obtain second reference data before a remote database, as described with reference to FIG. 3B. At 33, the mobile device 12 compares the gathered biometric data with reference data read on the data card, or at 33', the gathered biometric data with reference data derived from the interrogation of a remote database, for example a database of the police, and decides on whether there is a correspondence between them or not. Afterwards, at 34/34', the mobile device 12 transmits a message to the client equipment 11, confirming the identity of the individual, if a correspondence between the gathered biometric data and the reference data has been found, or disconfirming the identity of the individual otherwise. The result of the check is displayed on the screen of the client equipment 11.

It should be understood that with the invention, the identity check is essentially implemented by the mobile device 12, and the client equipment 11 just request access to the corresponding web service, display the pictogram and receive the result of the check. FIG. 4 illustrates an example of a hardware structure of a mobile device 12 according to the invention, configured to establish a secure connection and provide an embedded web service to a client equipment. The device 12 has a reduced size. For indication, it may for example have a length L of 80 mm, a width I of 25 mm and a thickness e of 10 mm. It is standalone (powered by a rechargeable battery) and integrates processing means, in particular a microprocessor 4191 and one or several memor(y/ies), allowing implementing the steps of the above-described method. For example, such a device 12 comprises a random-access memory (for example a RAM memory 4193) and a read-only memory (for example a ROM memory 4192 and/or a hard disk). Its processor is piloted by a computer program Pg, stored in the read-only memory 4192. On initialisation, the code instructions of the computer program are, for example, loaded in the read-access memory 4193 before being executed by the processor 4191. The read-access memory 4193 may also contain the computer program.

Advantageously, the device 12 is equipped with luminous interfaces, such as information lightings 411 and a LED lighting 412, to help the user manage the operation of said device. The device 12 comprises a camera configured to read the pictogram transmitted to a client equipment.

Advantageously, the mobile device 12 also comprises biometric means for providing an embedded web service according to the invention. For example, these means comprise a camera 413 and a front camera 414, configured to capture the face and the image of an iris of an individual. It may also comprise a contactless data reader, for example an NFC (standing for "Near Field Communication") type one, configured to only read and analyse the non-biometric identification data of an identity card, when these are not recorded in a chip; a microphone 415, configured to capture a voice signal of an individual; a fingerprint reader 416, configured to capture the fingerprints of an individual; and a data card reader 417, configured to read a data card, such as a driving license, comprising biometric data of the corresponding individual (fingerprints, face, etc.). For example, it consists of a smart card reader, comprising a slot into which the smart card of the individual is inserted and/or a contactless data reader, for example an NFC-type one, configured to read and analyse the non-biometric identification data stored on the identity card. The device 12 is also equipped with a removable protective cap 418, adapted to cover and protect the physical interfaces of said device 12.

6. EXAMPLES OF USE CASES OF THE MOBILE DEVICE

The mobile device and the connection method according to the invention that have just been presented, find numerous applications. As mentioned before, they could advantageously be used to facilitate the identity checks performed by the low-enforcement forces. For this purpose, all it needs is to equip a policeman with the mobile device according to the invention. Afterwards, he/she could connect this mobile device to his/her mobile phone or his/her tablet in a simple and secure manner, without entering any login or password; gather biometric data of the individual to be checked, such as his/her fingerprints, using the biometric data sensors integrated to the mobile device; and read an identification data card of the individual using the reader integrated to the mobile device. Afterwards, it is the device that takes care of comparing the gathered data and the reference data of the individual and of establishing a check result. Finally, the policeman simply receives a validation or invalidation message on his mobile phone, depending on the obtained result.

The policemen could also use this mobile device in their border control missions, in order to check the identity of the individuals crossing the border between two countries, before authorising them to pass or not, depending on the results of correspondence obtained between the biometric data gathered on the individuals and corresponding reference data.

The small size of the mobile device proposed by the invention and its simple design guarantee both a good robustness and a reasonable production cost. Hence, it is particularly adapted to a use by law-enforcement forces and to a deployment on a large scale.

This mobile device also finds application in a polling office, in order to check the identity of the electors and possibly to check up that the persons about to vote have not already participated in the vote, and more generally for any control of access to a site and/or to a service.

This identity check mobile device could also be used for controlling access of a maintenance technician to a computer network of a company. The device, using its physical interfaces equipped with biometric means, gathers the biometric data of the computer technician intervening on said network, checks his/her identity, checks up that he/she has a valid authorisation to access the computer network and grants him/her access to said network or not, depending on the obtained result.

To access the network of the company, the technician only needs the mobile device of the invention, serving as an accessory of his/her client equipment, for example his/her laptop or his/her mobile terminal. In contrast with the prior art, he/she no longer has to memorise complex and different login and password for each one of his/her clients, but just to present an identity card or a professional badge comprising identification data, biometric data and possibly an access authorisation associated to a validity date. Hence, with the invention, security of access to sensible and confidential data of a computer network of a company is reinforced in a simple and practical manner.

The invention claimed is:

1. A method for secure wireless connection between a client equipment, comprising a screen, and a mobile device equipped with a camera, wherein the method is implemented by said mobile device and comprises:
    establishing an initial wireless connection with said client equipment;
    transmitting a unique pictogram to said client equipment;
    reading said pictogram, displayed on the screen of said client equipment, using said camera;
    authenticating said client equipment, by comparing data of the pictogram transmitted with data of the pictogram read by said camera;
    establishing the secure wireless connection with said client equipment; and
    provisioning an access to a web service embedded on said mobile device, via said secure wireless connection, for said client equipment.

2. The method according to claim 1, comprising an initial authentication of a user of the mobile device using a biometric of said user.

3. The method according to claim 1, wherein the initial wireless connection is set in place following the activation of a web service embedded in said mobile device by a user of said mobile device.

4. The method according to claim 1, wherein the establishment of the secure wireless connection between said mobile device and said client equipment comprises opening an SSL tunnel type secure channel between said client and said mobile device.

5. The method according to claim 1, wherein the or one of said web services embedded in the mobile device is a service of identity check and/or authentication of an individual,
and said service comprises:
    gathering biometric data of the individual, using said mobile device;
    obtaining reference data of said individual, by said mobile device;
    comparing said gathered biometric data with said reference data of the individual, by the mobile device;
    transmitting a message to said client equipment via the secure wireless connection, said message comprising a confirmation of an identity of said individual, if a correspondence has been found between said gathered biometric data and said reference data, or a disconfirmation of the identity of said individual, otherwise.

6. The method according to claim 5, wherein first reference data of the controlled individual are obtained by reading an identification data card of the individual, using the mobile device, said identification data card comprising said first reference data.

7. The method according to claim 5, wherein second reference data of the controlled individual are obtained by interrogation of a remote database via the secure connection established with the client equipment, said reference biometric data are compared with the obtained biometric data, and the message confirming the identity of said individual is transmitted only if a correspondence between said obtained biometric data and said second reference data has been found.

8. A mobile device, comprising:
    a camera;
    a processor; and
    at least one memory, wherein said at least one memory comprises a computer program product stored thereon which when executed by said processor cause the processor to secure a wireless connection with a client equipment and provide access to a web service embedded in said mobile device to said client equipment, by performing operations comprising:
    establishing an initial wireless connection with said client equipment;
    transmitting a unique pictogram to said client equipment;
    reading said pictogram displayed on the screen of said client equipment, using said camera;
    authenticating said client equipment, by comparing data of the pictogram transmitted with data of the pictogram read by said camera;
    establishing the secure wireless connection with said client equipment; and
    providing to said client equipment an access to said web service embedded on said mobile device, via the secure connection.

9. The mobile device according to claim 8, which comprises:
    at least one biometric data sensor, configured to gather biometric data of an individual;
    at least one reader of a data medium, configured to read reference data stored in an identification data medium of said individual;
    and wherein the computer program product further causes said processor to:
    gather biometric data of an individual, using said biometric data sensor;
    obtain reference data of said individual by reading said identification data medium of said individual, using said reader;
    compare said gathered biometric data with said reference data of said individual;
    transmit a message to said client equipment via the secure wireless connection, said message comprising a confirmation of an identity of said individual, if a correspondence has been found between said gathered biometric data and said reference biometric data; or a disconfirmation of the identity of said individual, otherwise.

10. The mobile device according to claim 9, wherein the computer program product further causes said processor to obtain second reference biometric data of said individual, by interrogation of a remote database via the secure connection with the client equipment, and to compare the obtained biometric data with said second reference biometric data, the message confirming the identity of said individual being transmitted to said client equipment only if a correspondence has been found between said gathered biometric data and said second reference biometric data.

* * * * *